A. F. PIEPER

May 10, 1932.

DENTAL UNIT
Filed Sept. 8, 1925

Re. 18,460

2 Sheets-Sheet 1

Witness:
Fred. C. Brown

Inventor
Alphonse F. Pieper
By Brown, Boettcher + Dirmer,
Attys

A. F. PIEPER

May 10, 1932.

DENTAL UNIT
Filed Sept. 8, 1925

Re. 18,460

2 Sheets-Sheet 2

Witness:
Ed. C. Lorson

Inventor
Alphonse F. Pieper
By Brown, Boettcher + Dimmer
Attys.

Reissued May 10, 1932 Re. 18,460

UNITED STATES PATENT OFFICE

ALPHONSE F. PIEPER, OF ROCHESTER, NEW YORK

DENTAL UNIT

Original No. 1,649,251, dated November 15, 1927, Serial No. 54,896, filed September 8, 1925. Application for reissue filed September 17, 1928. Serial No. 306,586.

My invention relates to dental units of the type disclosed in Patent No. 1,376,356, issued April 26, 1921, to Oscar H. Pieper and Alphonse F. Pieper, and it contemplates improved construction and arrangement which will render the unit more flexible and its use more convenient. It is very important that the instruments, such as those fed by air, gas, or electricity, be so located that they can be used accurately and efficiently by the operator. The important object of the invention is, therefore, to so support such instruments that they may be positioned convenient for use throughout a wide range relative to the operator and the patient and so that, when not in use, they can be moved to be out of the way. In accordance with my invention I place the instruments together with supply cords or tubes in a cabinet on the end of a jointed arm, and preferably below the tray for holding loose instruments and materials. This arrangement will bring all the instruments together so that they can be moved to the most convenient position for use by the operator. Another feature of the invention is to have the cords extensible from the cabinet, so that after the cabinet has been swung to the most convenient position, the instruments with their respective cords or tubes may be selectively drawn out of the cabinet, the cabinet adequately protecting the instruments and their cords when not in use.

Figure 1:
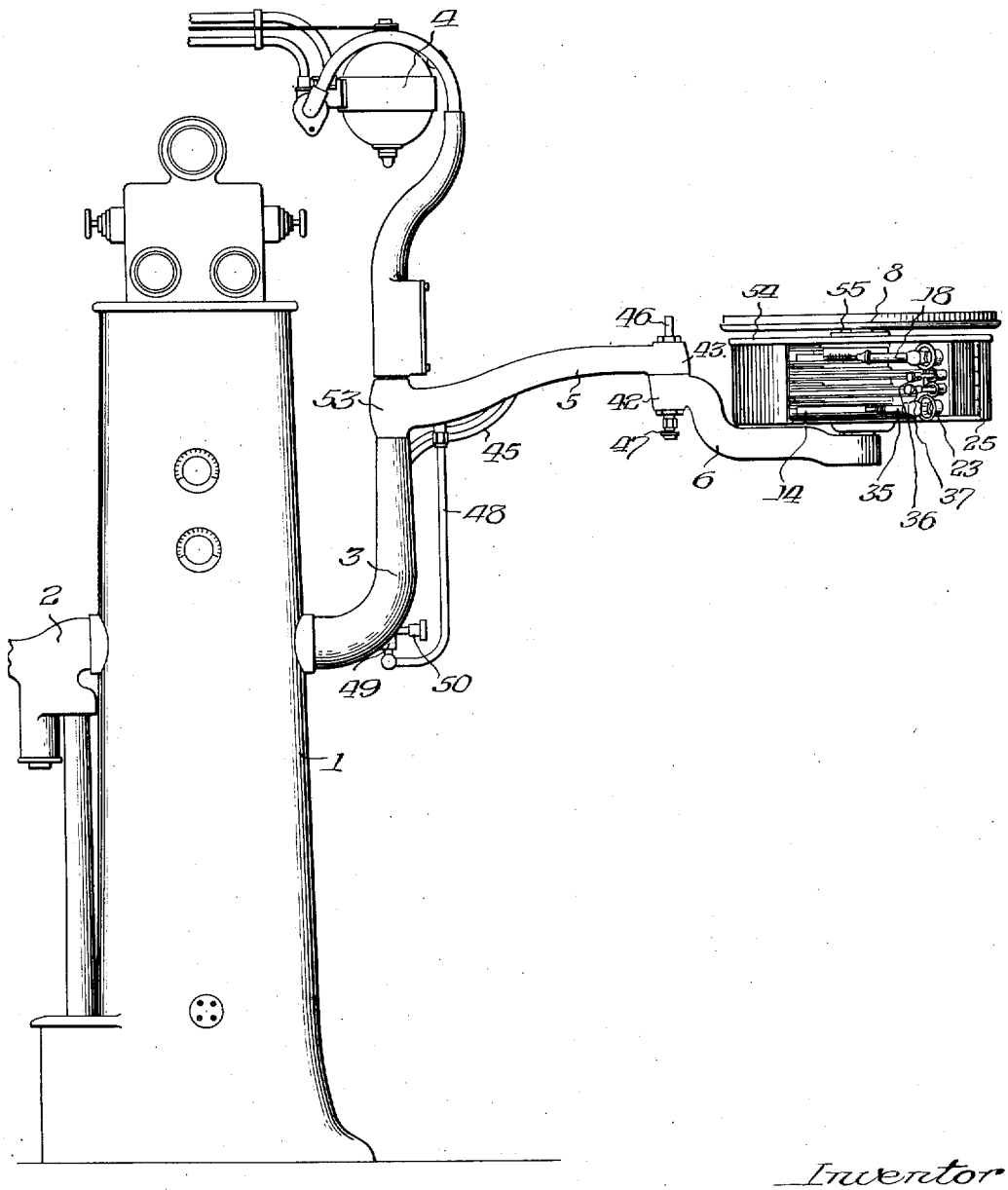
Figure 1 is a front elevational view of a unit showing my improved instrument supporting arrangement applied thereto.

As in the arrangement disclosed in the patent referred to, the pedestal 1 contains the various trunk lines for gas, electricity, or air with which the various tools and appliances are to be supplied. The bracket 2 supports the cuspidor and water supply controlling apparatus (not shown), while the bracket 3 primarily supports the electric motor 4 for driving the drills and other appliances, and this bracket 3 also serves for the support of the jointed arms 5 and 6, which at the outer ends support my improved instrument cabinet 7, and the instrument tray 8.

Figure 3:
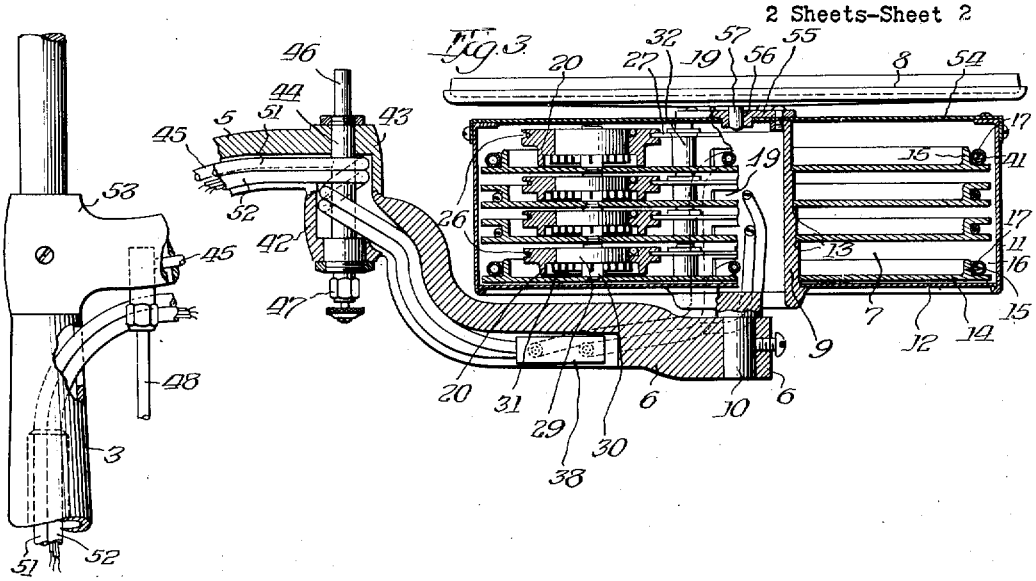
Fig. 3 is a side elevational view showing the cabinet and part of its supporting arm in vertical cross section.

The cabinet comprises a central hollow cylindrical hub 9 having the supporting post 10 extending from its bottom and engaging in the outer end of the outer arm 6 of the jointed bracket structure. Surrounding the hub is the cylindrical shell 11 between whose lower periphery and the lower part of the hub is secured the cabinet floor 12. The shell 11 is cylindrical, and the hub 9 is provided with a series of external steps 13 for supporting the cylindrical drums or discs 14. Adjacent to its outer periphery each drum has the vertical flange 15 forming with the disc a channel 16 for receiving the cord or tube 17 of one of the instruments designated as a whole A. Four instruments and four drums are shown, and in Fig. 2 the top drum supports the tube 17 for the hot air syringe 18. Between the drums the hub 9 has the openings 19 through which the inner ends of the various cords or tubes extend for connection with air, electric or gas supply. The inner end of each cord or tube is thus anchored to the hub, and on each wheel is a guide sheave structure 20 around which the respective tube or cord passes before engaging in the respective peripheral channel 16, as clearly shown in Fig. 2. The shell 11 has the opening 21 and the drums are cut away to leave the clearance space 22 within the cabinet for the instruments and their supporting sleeves or sockets 23 which are shown secured to the door 24 hinged at 25 to the shell 11 at the edge of the opening 21. When the unit is not in use, the instruments are all within their sockets 23 and the door 24 is swung into closed position, so that the various tubes will be supported within the clearance space 22. When it is desired to use the unit the door 24 is swung open so that the desired instruments may be readily gripped and drawn outwardly for use. As the drums are mounted on the steps 13 of the hub 9 they will readily rotate to permit unwinding of the cord or tubes therefrom when the respective instrument is drawn away from the cabinet. To resist such rotation and also for automatically returning the drums and rewinding the cords thereon, the upper part of each guide sheave 20 is provided with a peripheral slot 26 for a cable 27. The outer end of each cable is secured to the hub as by means of a screw 28, while the inner part of each cable is secured to the sheave structure. Each sheave structure is rotatable about a head 29 at the upper end of a pin or post 30 secured to the respective drum, and to each post is secured the inner end of a spiral spring 31 whose outer end is secured to the sheave structure 20 of the corresponding drum. When an instrument is drawn outwardly from the cabinet its drum will rotate in clockwise direction (Fig. 2), and as the sheave structure of the respective drum travels bodily therewith it will be rotated in clockwise direction as the cables thereon are secured to the hub 9. Such rotation of the sheave structure will cause winding up movement of the respective spring 31 and then when the instrument which has been drawn out, is released, the drum, by the action of the spring 31 acting on the sheave structure and the cable 27, will rotate the drum back to its normal position and the instrument will be drawn back into its supporting socket 23. In order to guide and facilitate the operation of the cables, a guide post 32 is provided on each drum for the respective cable, as clearly shown in Figs. 2 and 3.

Figure 2:
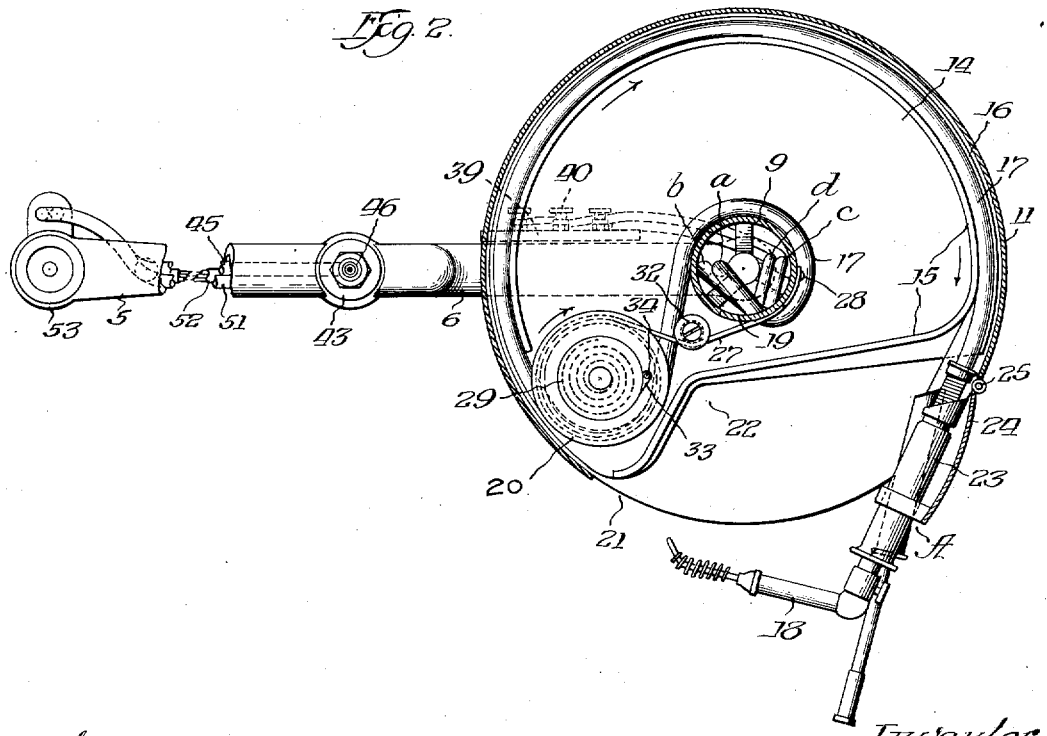
Fig. 2 is an enlarged plan view of the cabinet and its supporting arm, the instrument tray being removed.

In order that a drum may be locked in its service position while the tool is being used, suitable latch mechanism may be provided. As shown, I have provided between the sheave structure of each drum and its supporting head 28, a V-shaped channel 33 in which is a ball 34, the arrangement being such that when the drum is rotated to unwind its cord the ball will be released and the drum may be readily rotated. A slight sudden release of the cord will, however, permit the respective sheave structure to suddenly retract and catch the ball 34 in the narrow end of the wedge pocket 33, and then the cable sheave structure will be locked against further rotation and the respective drums will be held. After the operator is through using the instruments, a slight outward pull will cause release of the latch ball and then the spring will be free to return the reel to its normal position. In the hot air syringe there is usually provided an electric heating coil over which the air is passed to be heated before delivery from the tool nozzle. This tool must, therefore, be supplied with air and electric power. The tool 35 on the lower drum is used for supplying atomizing air flow and, therefore, requires air supply, while the instruments 36 and 37 on the intermediate drums require only electrical power. Within the outer arm 6 of the supporting bracket structure for the cabinet 7 is placed the air box or reservoir 38, with which the tubes for the instruments 18 and 35 connect to receive their air supply. These tubes specifically designated *a* and *b* extend through their respective hub openings 19 and then downwardly through the hub bottom and to the air reservoir 38. On the arm 6, either inside thereof, or on the outside as shown in Fig. 2, is a terminal board 39 having the terminals 40 of electric supply circuit, and the cords designated specifically *c* and *d*, which extend from the instruments 36 and 37, pass through their respective hub openings 19 and through the bottom of the hub and have their conductors connected with the proper terminals 40, so that the tools will receive the proper current supply. The conductors 41 in the tube *a* for the hot air syringe 18 are also connected with the proper electric terminals 40, so that the air heating coil will be supplied with electric current flow.

The outer arm 6 has the joint end 42 with which fits the joint end 43 of the inner arm 5, and these joint ends receive the hinge or pivot pin 44 which in this case is tubular for the flow of gas from the supply pipe 45 to a burner structure 46 through which the gas flow may be controlled by a valve 47. The gas pipe 45 extends through the hollow arm 5 and at its inner end connects with the pipe or tube 48, which at its lower end taps the outlet 49, which may be controlled by a valve 50. The air supply pipe 51 passes from the supply source at the interior of the pedestal 1, through the bracket 3, and then through the hollow arms 5 and 6 to the air reservoir 38. Likewise, the electric cable 52 extends from the pedestal through the bracket 3, and through the hollow arms 5 and 6, and its conductors are connected with the terminals 40 of the terminal board 39. The air pipe and the cable preferably wind around the hinge pin 44, one or more times in order that there may be sufficient slackness so that the arms 5 and 6 may be relatively swung. The tube 48 is also preferably flexible so that the entire bracket structure 5—6 may be swung around the axis of the bracket 3 on which it is mounted by means of a sleeve 53.

The top of the cabinet 7 is closed by a detachable cover 54 and the hub 9 is closed at its upper end by the plate 55 which has the central pivot hole 56 for receiving the pin 57 extending from the instrument tray 58. This tray supports the loose and miscellaneous instruments and appliances and material, and being directly over the cabinet 7 practically all of the instruments are localized for the ready selection and use of the operator. By means of the swinging jointed bracket structure 5, 6, the cabinet and tray may be swung into the most convenient position with reference to the patient and the operator, and then any of the tools in the cabinet can be withdrawn therefrom and used with convenience and efficiency by the operator. When not in use the tools A are enclosed within the cabinet and fully protected. When the cabinet is to be used, the door 24 is swung open to present the various instruments A for selection. By increasing the height of the cabinet any number of instrument supporting drums may be installed and the instruments connected with either the air or the electric supply terminals 38 and 39.

Changes in modification can be made in the construction and arrangement without departing from the spirit and scope of the invention.

I claim:

1. In a dental unit, the combination of a supporting pedestal, a cabinet mounted on said pedestal, a stationary integral hub for said cabinet, a vertical tier of drums within said cabinet and mounted on said hub to rotate thereon, a power supply cord wound around each drum and anchored at its end to said hub, a dental tool at the outer end of each cord, pull on an instrument causing rotation of the respective drum and unwinding of the tool cord therefrom whereby the tool may be extended from said cabinet, and means for automatically rotating a drum back to its normal position to rewind the respective cord thereon when its tool is released.

2. In a dental unit, the combination of a supporting pedestal, a cylindrical cabinet mounted on said pedestal, a stationary hub at the axis of said cabinet, a vertical tier of drums rotatably mounted within said cabinet on said hub, a power supply cord wound on each drum and anchored at its inner end to said hub, a tool at the outer end of each cord, tool supporting sockets on said cabinet normally receiving said tools, pull on one of said tools causing release thereof from its socket and unwinding of the cord from the respective drum whereby said tool may be extended from said cabinet, and spring means for resisting unwinding rotation of said drum and for rotating said drum to rewind said cord upon release of the respective tool.

3. In a dental unit, the combination of a supporting pedestal, an arm extending therefrom, a cabinet on the end of said arm having a central hollow hub, a tier of drums within said cabinet rotatably mounted on said hub, a cord wound around each drum and anchored at its inner end to the hub, an instrument at the outer end of each cord, supports on said cabinet for said instruments, release of an instrument from its support and pull thereon causing the respective drum to rotate and unwinding of the instrument cord therefrom whereby said instrument may be extended from said cabinet, some of said cords being adapted for the flow of fluid and other cords having electrical conductors therethrough, fluid terminals and electric terminals on said arm and connections therefrom extending through said hub to the respective cords, and electric supply conductors extending through said arm to said terminals.

4. In a dental unit, the combination of a pedestal, a cabinet supported thereon, a plurality of concentric reels rotatable in said cabinet, a power supply cord wound on each reel and anchored at one end at the reel axis, an instrument at the outer end of each cord, said cabinet having an opening, a door for said opening, supports on said door for said instrument, a space within said cabinet for accommodating said supports when said door is closed whereby said instruments will be within said cabinet, said instruments being in position to be withdrawn from their supports when the door is open and said cords selectively unwound from said reels, means for rotating the reels to normal position to rewind the cords thereon, and means for conducting power from said pedestal to said cords.

5. In a dental unit, the combination of a support, a drum rotatably mounted on said support, a cord anchored at its inner end to the support at the axis of said drum and extending around the drum and terminating at its outer end in an instrument, pull on said instrument causing rotation of the drum, a sheave journaled on said drum, a cable encircling said sheave and secured at its inner end thereto and at its outer end being anchored to said support to cause rotation of said sheave when said drum is rotated for unwinding of said cord therefrom, and a spring resisting turning of said sheave and for restoring said sheave and drum to normal position upon release of the cord.

6. In a dental unit, the combination of a support, a drum rotatably mounted on said support, a cord anchored at its inner end to the support at the axis of said drum and extending around the drum and terminating at its outer end in an instrument, pull on said instrument causing rotation of the drum, a sheave journaled on said drum, a cable encircling said sheave and secured at its inner end thereto and at its outer end being anchored to said support to cause rotation of said sheave when said drum is rotated for unwinding of said cord therefrom, and a spring resisting turning of said sheave and for restoring said sheave and drum to normal position upon release of the cord, said cord passing around said sheave to be guided thereby into engagement with the drum periphery.

7. In a dental unit, the combination of a support, a drum structure journaled on said support for rotational movement and having a drum surface adjacent to its periphery, a cord anchored at its inner end to said support and engaging with said drum surface and terminating at its outer end in an instrument, and a sheave on said drum structure for guiding said cord from said support to said drum surface.

8. In a dental unit, the combination of a support, a disc mounted on said support for rotational movement, a flange extending concentric with the disc axis adjacent to the disc periphery and forming a drum surface, a cord anchored at its inner end to the support at the disc axis and engaging with said drum surface and terminating at its outer end in an instrument, a sheave on said disc for guiding said cord to said drum surface, said flange being deflected inwardly along a section thereof to form clearance space for accommodating said instrument.

9. In a dental unit, the combination of a hollow supporting hub, a drum structure journaled on said hub and having a guide surface concentric therewith, a cord anchored at its inner end to said hub and extending to the interior thereof, the outer end of said cord engaging said guide surface and terminating in an instrument, and power supply connection with the inner end of said cord.

10. In a dental unit, the combination of a supporting hub, a drum structure journaled on said hub and having a peripheral guide surface concentric with said hub, a cord wound at its inner end around said hub and anchored thereto, the outer part of said cord engaging said guide surface and terminating in an instrument, pull on said instrument causing rotation of said drum structure and unwinding of the cord from said surface and from said hub, and means resisting turning movement of said drum structure.

11. In a dental unit, the combination of a supporting hub, a drum structure journaled on said hub and having a peripheral guide surface concentric with the hub, a cord wound at its inner end around said hub and anchored thereto, the outer part of said cord engaging with said surface and terminating in an instrument, a sheave guiding said cord from said hub to said surface, pull on said instrument causing rotation of said drum structure and inwinding of said cord from said surface and hub and means resisting rotation of said drum structure.

12. In a dental unit, the combination of a hollow supporting hub, a drum structure journaled on said hub and having a peripheral guide surface concentric therewith, a cord wound at its inner end around said hub and extending into the inside thereof for connection with power supply conductors, the outer part of said cord engaging with said surface and terminating in an instrument, pull on said instrument causing rotation of said drum structure and unwinding of the cord from said surface and hub, and means resisting rotation of said drum structure and for returning it to normal position after release of the instrument.

13. In a dental unit, the combination of a support, a cabinet on said support, a drum structure rotatable within said cabinet, a cord stationarily anchored at its inner end at the drum structure axis and engaging the periphery of said drum and terminating in an instrument, an outlet opening for said cabinet, a door for said opening, a support on said door for said instrument, said instrument being supported by the door within the cabinet when the door is closed, removal of said instrument from said support and pull thereon causing rotation of said drum structure and unwinding of the cord therefrom, and means resisting rotational movement of said drum structure and for restoring it to normal position upon release of said instrument.

14. In combination, a supporting arm, a casing mounted thereon, a drum mounted to rotate on a vertical axis in said casing, said drum having a central opening, a conductor leading through said arm and said opening to said drum to lie on a peripheral portion thereof, means for permitting the exit of the end portion of said conductor from said casing, a dental instrument on the end of said conductor, and spring means for resisting withdrawal of said conductor and for rotating said drum to retract it.

15. In combination, a casing, a tier of drums mounted to rotate on a vertical axis in said casing, each of said drums having a central opening, a plurality of conductors leading into the center of said casing and respectively to said drums, each of said conductors leading to the periphery of its respective drum and being wound thereon, means for permitting the exit of the end portions of said conductors from said casing, a dental instrument on the end of each of said conductors, and spring means for each of said drums resisting withdrawal of the associated conductor and for rotating said drum to retract it.

16. In combination, a supporting arm, a casing mounted thereon, a drum mounted to rotate on a vertical axis in said casing, said drum having a central opening, a conductor leading through said arm and said opening to said drum to lie on a peripheral portion thereof, means for permitting the exit of the end portion of said conductor from said casing, a dental instrument on the end of said conductor, spring means for resisting withdrawal of said conductor and for rotating said drum to retract it, and a ball clutch for arresting the retracting motion of said drum.

17. In combination, a supporting arm, a casing mounted thereon, a drum mounted to rotate on a vertical axis in said casing, said drum having a central opening, a conductor leading through said arm and said opening to said drum to lie on a peripheral portion thereof, means for permitting the exit of the end portion of said conductor from said casing, a socket at said exit means, a dental instrument on the end of said conductor fitting in said socket, and spring means for resisting withdrawal of said conductor and for rotating said drum to retract it.

18. In combination, a supporting arm, a circular casing mounted on said arm, a circular tray mounted on said casing, a tier of rotatable drums mounted concentrically within said casing, a flexible conductor cord wound upon each of said drums and leading out of said casing, said cords entering said casing and tier of drums centrally from said arm, a dental instrument on the end of each of said cords, and means for independently operating each of said drums to effect withdrawal and retraction of each of said instruments.

19. In a dental unit, the combination of a supporting pedestal, a cabinet mounted on said pedestal, a hub at the axis of said cabinet, a tier of rotatable carriers mounted about said hub within said cabinet, a power supply cord wound on each carrier and anchored at its inner end at said hub, a tool at the outer end of each cord, tool supporting sockets on said cabinet normally receiving said tools, pull on one of said tools causing release thereof from its socket and unwinding of the cord from the respective carrier whereby said tool may be extended from said cabinet, and spring means for resisting unwinding rotation of said carrier and for rotating said carrier to rewind said cord upon release of the respective tool.

20. An accessory unit comprising a cylindrical casing, a tool holder mounted tangentially on the peripheral wall of said casing, an operative tool normally engaged in said holder when not in use and arranged to be withdrawn therefrom for operative purposes, a circular carrier rotatably mounted within said casing and having a peripherally disposed flange, a flexible conductor coiled with respect to said carrier within and without said flange and at one end passing out of said casing at the center thereof and at the other end connected with said tool, and a spring tending to effect rotation of said carrier and retraction of said tool.

21. In combination, a casing, a drum mounted to rotate on a vertical axis in said casing, said drum having a central opening, a conductor leading through said opening to said drum to lie on a peripheral portion thereof, means for permitting the exit of the end portion of said conductor from said casing, a dental instrument on the end of said conductor, spring means for resisting withdrawal of said conductor and for rotating said drum to retract it, and a wedge clutch for arresting the retracting motion of said drum.

22. An accessory unit comprising a support having a central opening affording a space in which power dispensing means is disposed, an annular disc rotatably mounted on said support and embracing the space in which said power dispensing means may be disposed, a transverse flange on said disc, and a flexible conductor coiled in associated relation to said annular disc and lying partly within said flange and partly against the outside periphery thereof and arranged to connect a relatively movable tool with said power dispensing means.

In witness whereof, I hereunto set my hand at Rochester, New York, this 14th day of September, 1928.

ALPHONSE F. PIEPER.